Feb. 7, 1928.

F. A. BANDHOLTZ 1,658,756

SAFETY TREAD

Filed March 28, 1927

WITNESSES:
Cris Feinle.
S.W. Foster.

INVENTOR,
Frank A. Bandholtz.
BY Munn & Co.
ATTORNEYS.

Patented Feb. 7, 1928.

1,658,756

UNITED STATES PATENT OFFICE.

FRANK A. BANDHOLTZ, OF BROOKLYN, NEW YORK.

SAFETY TREAD.

Application filed March 28, 1927. Serial No. 179,113.

This invention relates to safety treads, and more particularly to a safety tread for steps and the like, an object of the invention being to provide a tread which will prevent slipping on the surface of the tread and at the edge of the tread.

A further object is to provide a safety tread with an improved construction of base whereby anti-slipping material is securely embedded and held therein, and in which the forward or outer edge of the tread is so constructed as to permit a portion thereof to be formed by the anti-slipping material which is securely keyed therein.

A further object is to provide a tread of the character stated which may be constructed to fit any stair tread and which will have long life and prevent accidents from slipping which frequently occur with ordinary treads.

With these and other objects in view, the invention consists in certain novel features of construction and combinations and arrangements of parts which will be more fully hereinafter described and pointed out in the claims.

In the accompanying drawings—

1 represents the riser and 2 the tread of a step on which my improved safety tread 3 is located. My improved tread comprises a base 4, which is preferably of metal, and is cast or otherwise formed with longitudinal grooves 5 in which anti-slipping material 6 is located and projects, at least, as far as the upper surface of the base. As a matter of fact this material may extend beyond the upper face of the base and wear down to the upper face of the base.

It is to be understood that in employing this term "anti-slipping material" I employ it in its broadest possible sense to include any material for the purpose such as carborundum, artificial stone, or any substance or composition which will prevent slipping and which will be harder than the metal of the base, so that the metal of the base will wear more rapidly than the anti-slipping material, hence, the function of the tread will not be destroyed by wear.

Figure 1:
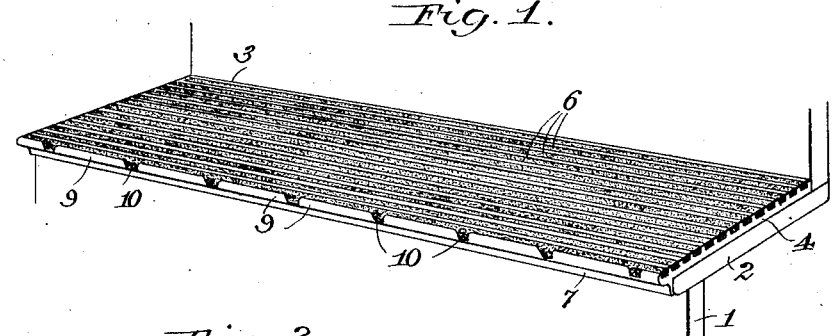
Figure 1 is a perspective view illustrating my improved tread in operative position on a step.

The base 4 near its forward edge is made with a depending flange 7 which rests against the front edge of the step tread, and it is to be understood that the tread may be secured to the step in any approved manner. My invention resides more particularly in the construction of the safety tread at its forward edge which, as noted particularly in Figure 1, projects beyond the edge of the step tread and is formed with a longitudinal groove 8 adjacent its forward edge, this groove corresponding to the grooves 5 although it is preferably deeper than the grooves 5.

The outer wall of this groove 8 is formed by upstanding beveled or curved lip 9 which is bisected at any desired number of points or places by tapering recesses 10 so that, as a matter of fact, instead of providing a single lip 9 I provide a series of such lips spaced apart by the recesses 10. These recesses 10 at their inner ends may be connected by longitudinal grooves 11, as shown in Figure 2 and 3, and into these grooves 8, 11 and recesses 10 I locate the anti-slipping material 6 which extends to the front edge of the tread as it is anchored in the recesses 10 and constitutes a portion of the forward edge of the tread.

By reason of the arrangement of grooves and recesses it will be noted that the anti-slipping material will be securely anchored and any tendency to break away from the base is overcome.

Figure 4:
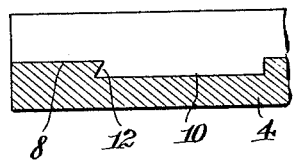
Figure 4 is a fragmentary view in longitudinal section on the line 4—4 of Figure 2.

It is, of course, to be understood that this anti-slipping material at the forward edge of the tread will sustain a considerable wear and strain, and secure anchoring is desirable, and with this end in view any of the walls of the recesses and grooves may be dovetailed, as shown at 12 in Figure 4.

Figure 2:
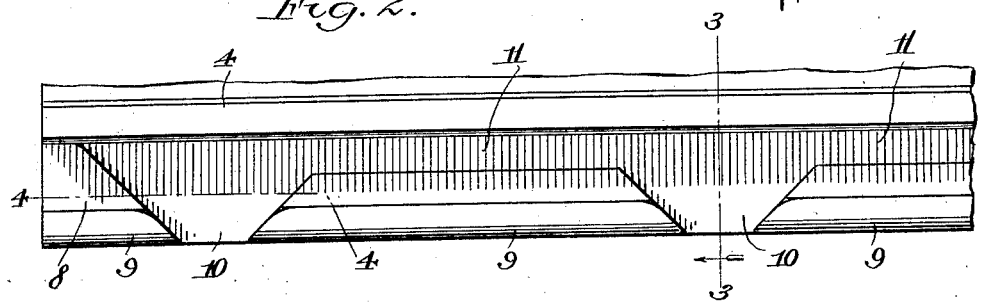
Figure 2 is a fragmentary plan view of a section of the forward end of the tread before the anti-slipping material is placed therein.
Figure 3:
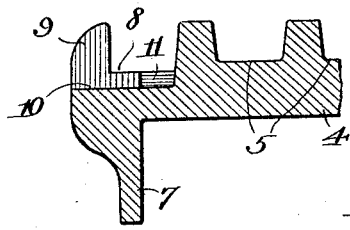
Figure 3 is a view in transverse section on the line 3—3 of Figure 2.
Figure 5:
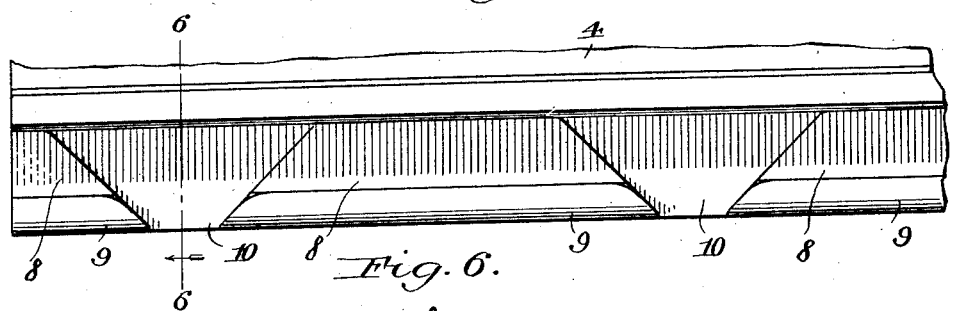
Figure 5 is a view similar to Figure 2 illustrating a modification.
Figure 6:
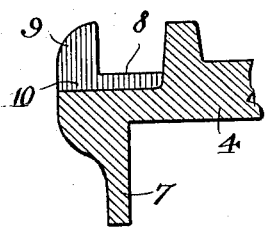
Figure 6 is a view in transverse section on the line 6—6 of Figure 3.

In the construction shown in Figures 5 and 6 the same idea is carried out except that the grooves 11 of Figures 2 and 3 are omitted. It will then be observed that when the anti-slipping material is molded or otherwise formed in the grooves and recesses of the base 4 such material will constitute a wearing surface at the top as well as a wearing surface throughout at least a portion of the forward edge, and the metal of the base is so constructed and arranged as to securely key the anti-slipping material therein and to protect the same from breaking away by reason of the wear thereon. As the anti-slipping material is located in the recesses 10 and extends to the forward edge of the tread it will prevent slipping of the foot as it is moved over the edge of the tread. It is, of course, to be understood that there will be a sufficient number of these recesses 10 to provide at least one exposure of the anti-slipping material for the shoe as it passes over the edge of the tread.

Various slight changes and alterations might be made in the general form of the parts described without departing from my invention, and hence I do not limit myself to the precise details set forth but consider myself at liberty to make such slight changes and alterations as fairly fall within the spirit and scope of the appended claims.

I claim:

1. A tread of the character described, comprising a base having longitudinal grooves therein and having recesses in its forward edge communicating with the forward groove, said recesses being tapered so that the walls thereof flare apart from the forward edge of the tread toward the inner end of the groove, said base having in its forward groove longitudinal grooves connecting the recesses, and anti-slipping material located in all of the grooves and in the recesses and presenting a wearing surface at the top of the base and throughout portions of the forward edge of the base.

2. A tread of the character described, comprising a base, a depending flange on the edge of the base adapted to be located against the forward edge of a step, said tread having in its forward or nose portion and in its upper face a series of tapering recesses, said recesses narrowest at the nose of the tread and increasing in width toward the rear of the tread, and anti-slipping material filling said recesses.

FRANK A. BANDHOLTZ.